(12) United States Patent
Munstermann

(10) Patent No.: US 9,333,731 B2
(45) Date of Patent: May 10, 2016

(54) DEVICE FOR BONDING TEXTILE FIBERS BY MEANS OF HOT GASES

(75) Inventor: Ullrich Munstermann, Egelsbach (DE)

(73) Assignee: TRUETZSCHLER NONWOVENS GMBH, Egelsbach (DE)

( * ) Notice: Subject to any disclaimer, the term of this patent is extended or adjusted under 35 U.S.C. 154(b) by 67 days.

(21) Appl. No.: 14/006,402

(22) PCT Filed: Mar. 22, 2012

(86) PCT No.: PCT/EP2012/055148
§ 371 (c)(1),
(2), (4) Date: Sep. 20, 2013

(87) PCT Pub. No.: WO2012/127013
PCT Pub. Date: Sep. 27, 2012

(65) Prior Publication Data
US 2014/0000797 A1  Jan. 2, 2014

(30) Foreign Application Priority Data

Mar. 23, 2011  (DE) .................... 20 2011 004 335 U

(51) Int. Cl.
*D04H 1/54*  (2012.01)
*F26B 13/16*  (2006.01)
(Continued)

(52) U.S. Cl.
CPC *B32B 37/06* (2013.01); *D04H 1/49* (2013.01); *D04H 1/54* (2013.01); *D06C 23/04* (2013.01); *F26B 13/16* (2013.01); *Y10T 156/1023* (2015.01)

(58) Field of Classification Search
CPC ..... D04H 1/54; F26B 13/16; Y10T 156/1023; Y10T 156/1084

USPC .......................... 156/209; 264/119; 425/83.1
See application file for complete search history.

(56) References Cited

U.S. PATENT DOCUMENTS 3,750,237 A  8/1973  Kalwaites
3,943,735 A  3/1976  Riedel
(Continued)

FOREIGN PATENT DOCUMENTS

DE          2425738 A1   12/1975
DE        69412106 T2    3/1999
(Continued)

*Primary Examiner* — Carson Gross
(74) *Attorney, Agent, or Firm* — FisherBroyles, LLP; Robert Kinberg

(57) ABSTRACT

In a device for bonding web-shaped textile products by means of hot gases, in particular for bonding a nonwoven fabric that has thermally fusible fibers and/or filaments, comprising
 a drum that is rotatably mounted within a treating chamber to which hot air is supplied, said drum comprising a circumferential surface which is designed to be gas-permeable by means of a plurality of openings and which is partly looped by the web to be bonded
 the device also comprises a suction unit which is paired with the drum and by means of which the drum is placed under suction such that the hot air flows out of the treating chamber through the material web to be bonded, and
 the device comprises a heater for heating the air that is conducted out of the drum,
it is provided that a structured lining (8) that embosses the textile product (1, 11) by means of a plurality of openings (9) during the bonding process is wound onto the drum (5) circumferential surface that is designed to be gas-permeable, said openings (9) being larger than the openings in the drum (5) circumferential surface that is designed to be gas-permeable.

10 Claims, 4 Drawing Sheets

Figure 1:
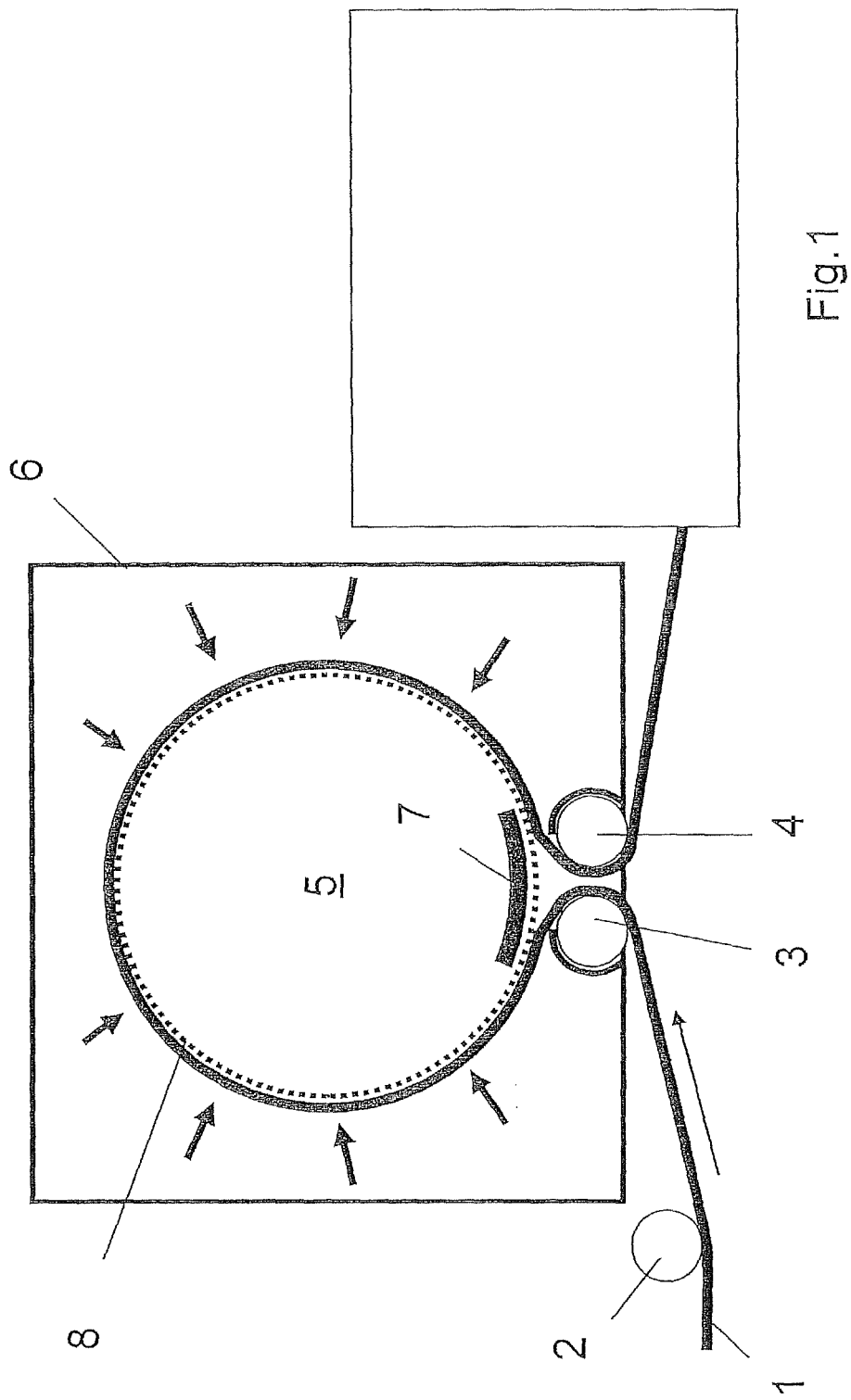

(51) Int. Cl.
*B32B 37/06* (2006.01)
*D04H 1/49* (2012.01)
*D06C 23/04* (2006.01)

(56) References Cited

U.S. PATENT DOCUMENTS

| | | | |
|---|---|---|---|
| 4,592,943 A * | 6/1986 | Cancian et al. | 428/171 |
| 5,674,591 A * | 10/1997 | James et al. | 428/156 |
| 2005/0015950 A1 * | 1/2005 | Fleissner | 28/167 |
| 2005/0155200 A1 * | 7/2005 | Fleissner | 28/104 |
| 2008/0066275 A1 | 3/2008 | Munstermann | |

FOREIGN PATENT DOCUMENTS

| | | |
|---|---|---|
| DE | 10132563 A1 | 1/2003 |
| DE | 102007053030 A1 | 5/2009 |
| EP | 0105730 A2 | 4/1984 |
| EP | 0511025 A1 | 10/1992 |
| WO | 95/06769 A1 | 3/1995 |
| WO | 03/008691 A2 | 1/2003 |

* cited by examiner

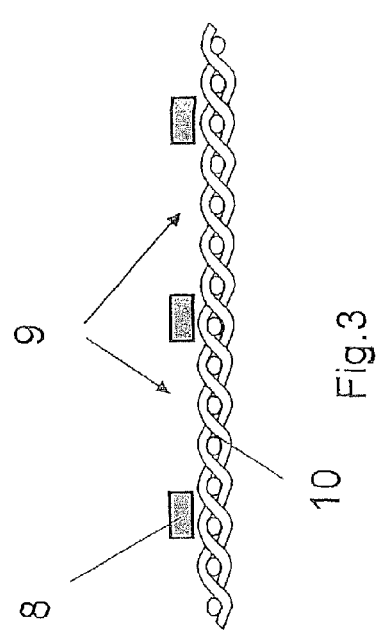
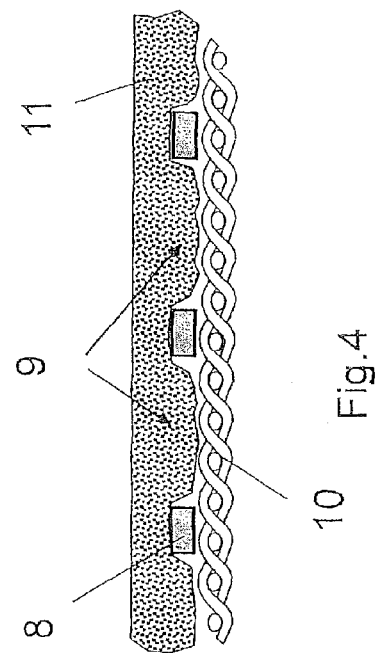
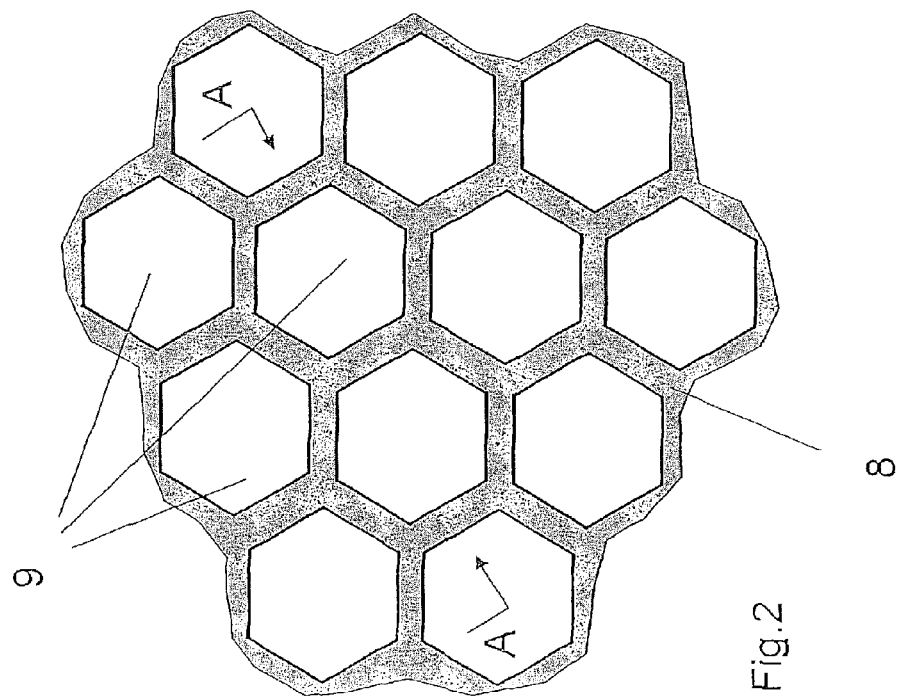

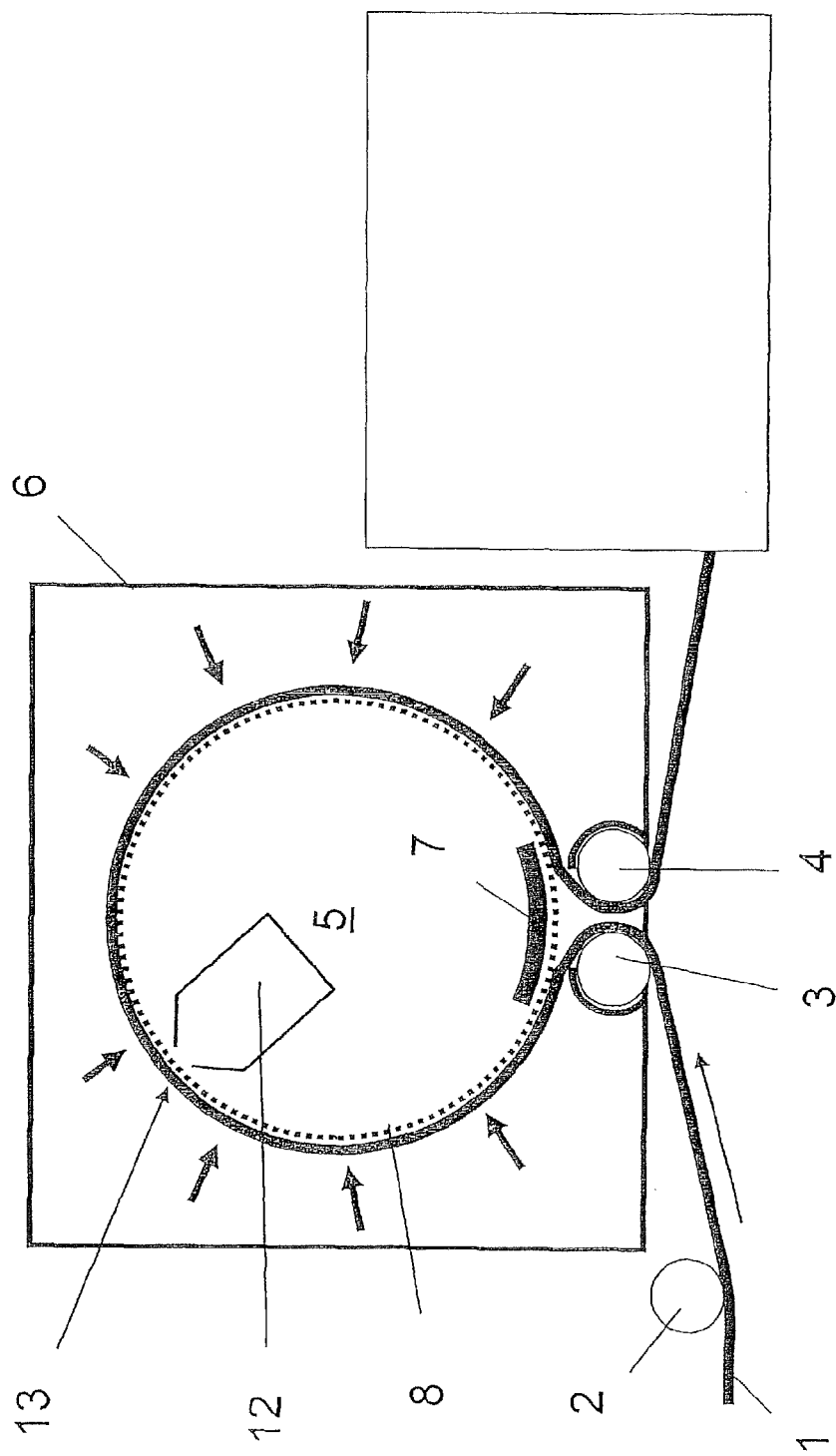

DEVICE FOR BONDING TEXTILE FIBERS BY MEANS OF HOT GASES

The invention refers to a device for bonding web shaped textile products by means of hot gases, in particular for bonding a nonwoven fabric that has thermally fusible fibers and/or filaments, including a drum that is rotatably mounted within a treating chamber to which hot air is supplied, said drum comprising a circumferential surface which is designed to be gas-permeable by means of a plurality of openings and which is partly wrapped by the web to be bonded. The device also includes a suction unit which is paired with the drum and by means of which the drum is placed under suction such that the hot air flows out of the treating chamber through the material web to be bonded, and includes a heater for heating the air that is conducted out of the drum. The invention also refers to a method for bonding a web-shaped textile product by means of hot gases, in particular for bonding a nonwoven fabric that has thermally fusible fibers and/or filaments by wrapping a material web around a gas-permeable flow-through drum arranged in a treatment chamber to which hot air is supplied, wherein the flow-through drum comprises at least a gas-permeable circumferential surface with a plurality of openings, and wherein a structuring shell with openings is arranged on the circumferential surface, applying suction in the flow-through chamber so that the hot air is drawn from the treatment chamber through the material web over the entire surface, wherein the suction in the flow-through drum and the temperature of the hot air inside the treatment chamber are chosen such that the material web is bonded on the structuring shell and is patterned by the openings in the structuring shell.

Drier devices (belt driers, drum driers) are used to remove humidity from a material web fed through the drier. The term oven refers to devices used to apply heat to the material web (the fibers and/or filaments). Thereby, a thermal processing, for example of thermoplastic fibers of a nonwoven (thermobonding), can be performed—moreover, bonding agents present in a nonwoven are activated by ovens in order to bond the nonwoven.

DE 101 32 563 A1 describes a drier in which the surface carrying the web-shaped textile product has patterning openings. In particular, a nonwoven web is wound around a drier drum and is flown through by heated air. The nonwoven has been compacted before by the application of hydrodynamics and is subjected in the drier to the removal of the humidity introduced during the application. The patterning openings in the drier drum leave a pattern, since the hot air flowing through the nonwoven draws the fibers into the patterning openings.

It is known from DE 694 12 106 T2 to bond a fabric containing fusible fibers by the use of vapor jets. Superheated vapor is used to cause an incipient fusion/fusion of the fibers which bond, whereby the fiber material becomes bonded.

DE 10 2007 053 030 A1 shows a drier with integrated hot vapor application, whereby the nonwoven formed by fusible fibers is both bonded and structured.

Thus, the invention starts from a device for bonding a textile product by means of hot gases, in particular for bonding a nonwoven fabric that has thermally fusible fibers and/or filaments, the device comprising a drum that is rotatably mounted within a treating chamber and has a circumferential surface which is designed to be gas-permeable by means of a plurality of openings, the circumferential surface being partly looped by the web to be bonded, the device further comprising a suction unit by means of which the drum is placed under suction, and a heater to heat the air conducted out of the drum.

This object is achieved by providing a device including a structured lining that embosses the textile product by means of a plurality of openings during the bonding process is wound onto the drum circumferential surface that is designed to be gas-permeable, the openings being larger than the openings in the drum circumferential surface that is designed to be gas-permeable.

The object is also achieved by the method, which includes by wrapping a material web around a gas-permeable flow-through drum arranged in a treatment chamber to which hot air is supplied, wherein the flow-through drum comprises at least a gas-permeable circumferential surface with a plurality of openings, and wherein a structuring shell with openings is arranged on the circumferential surface, applying suction in the flow-through chamber so that the hot air is drawn from the treatment chamber through the material web over the entire surface, wherein the suction in the flow-through drum and the temperature of the hot air inside the treatment chamber are chosen such that the material web is bonded on the structuring shell and is patterned by the openings in the structuring shell.

This object is achieved with the features of claims 1 and 11. Advantageous embodiments of the invention are described in the dependent claims.

The invention provides for mounting a structuring shell on the gas-permeable circumferential surface of the drum, the shell patterning the textile material by means of a plurality of openings during a bonding process, wherein these openings are larger than those in the gas-permeable circumferential surface of the drum.

The gas-permeable circumferential surface preferably is a layer of the drum shell.

The following is provided as developments of the invention:

- the openings in the gas-permeable circumferential surface of the drum have a diameter smaller than 1 mm, while, in this case, the openings in the structuring shell patterning the nonwoven have a diameter larger than 2 mm, in particular larger than 2.5 mm, preferably larger than 5 mm and preferably smaller than 20 mm. The web between the openings or the holes in the structuring shell is preferably approximately 2 mm wide.
- as an alternative, the openings in the gas-permeable circumferential surface of the drum may have a diameter smaller than 8 mm, preferably smaller than 5 mm, while, in this case, the openings in the structuring shell have a diameter larger than 8 mm.
- the gas-permeable circumferential surface of the drum can be designed as a screen fabric. The mesh width of the screen fabric is preferably smaller than 1 mm. The screen fabric is preferably mounted on a rigid drum shell layer provided with openings. As an alternative, the structuring shell may be mounted directly on the rigid drum shell layer provided with openings. In this case, the gas-permeable circumferential surface is the drum shell layer provided with openings.
- the structuring shell mounted on the gas-permeable circumferential surface of the drum is designed as a metal sheet with openings or a perforated metal sheet.
- the metal sheet has a thickness of more than 1 mm, preferably more than 2.5 mm.
- within the drum, a suction box may be arranged that is connected with a suction system and has a suction slot directed towards the lower side of the drum circumference. As an alternative, the entire surface of the drum may be subjected to suction from below in the wrapping region of the textile product, i.e. in the product region.

The circumferential surface of the drum is covered with a screen fabric, for example, with the openings in the screen fabric being smaller than 1 mm. A screen fabric typically used in thermobonding devices has 8/8 weft/warp threads per cm (20 mesh fabric), the wires having a diameter of 0.4 mm. This results in an open percentage (permeability) of about 30%. A finer screen mesh is designed as a 60 mesh fabric with 24/22 weft/warp threads per cm.

For a thread thickness of 0.19 mm, the open percentage is about 30%.

According to the invention, a patterning surface or a structuring shell is mounted on the screen fabric, which presents the patterning openings. Preferably, these openings have a diameter larger than 2 mm—in particular larger than 5 mm. Here, the diameter of an opening is understood to be the smallest dimension.

The patterning surface or the structuring surface is manufactured as a metal sheet having a thickness of more than 1 mm, preferably more than 2.5 mm. This sheet or the structuring shell is wrapped and tautened about the outer circumference of the drum as one or several pieces or segments. Thus, the structural shell can be of a single piece or a multi-piece design. The parts or segments of the multi-piece structural shell are preferably joined in a seamless manner so that no seam imprints are made in the material web when it is bonded and patterned on the structuring shell. The sheet or sheets are fastened by means of bands or other suitable tensioning means that are located outside the format to be processed. One may also use tensioning means arranged within the range of the working width, i.e. the range in which the material web is present on the structuring shell. For example, tensioning means may be mounted in the centre of the working width and at the respective outer sides. In the finished textile product, the fastening means provided within the working width cause imprints or marks. These imprints or marks can be cut off from the finished product. For example, a middle strip and the edge strips can be cut off.

The invention profits from the insight that a nonwoven of thermally fusible fibers can both the bonded and at the same time be structured by a thermobonding process performed with the drum of the present invention. The patterning openings of the patterning surface or structuring shell mounted on the drum formed as circles or regularly distributed hexagons, for instance. As an alternative, the patterning openings may also be triangles, squares or other optionally shaped openings. Such surface structuring results in an improved appearance; further, it is possible to obtain an increase in volume.

The invention is used to bond and structure nonwovens composed of or comprising thermally fusible fibers or filaments. Mixtures of fibers having different melting temperatures are also used, as well as bicomponent fibers of the core/shell type. The temperature of the hot gas applied, as well as the flow-through rate of the gas through the nonwoven are chosen corresponding to the fibers or filaments used.

The device of the invention may be a so-called omega bonding device in which the material web to be treated is guided around a permeable flow-through drum. Further, bonding devices may be used in which the material web to be processed is guided around several flow-through drums.

A development of the invention provides that an additional suction device is arranged within the drum carrying the material web, which suction device draws the hot air from the treatment chamber through the material web, using a higher vacuum. Thus, the structuring effect can be improved. Further, an existing device can be upgraded in a simple manner.

Further, in a method for bonding a web-shaped textile product by means of hot gases, in particular for bonding a nonwoven fabric that has thermally fusible fibers and/or filaments, the following steps are advantageously provided:

wrapping a material web around a gas-permeable flow-through drum arranged in a treatment chamber to which hot air is supplied, wherein the flow-through drum comprises at least a gas-permeable circumferential surface with a plurality of openings, and wherein a structuring shell with openings is arranged on the circumferential surface, applying suction in the flow-through chamber so that the hot air is drawn from the treatment chamber through the material web over the entire surface, wherein the suction in the flow-through drum and the temperature of the hot air inside the treatment chamber are chosen such that the material web is bonded on the structuring shell and is patterned by the openings in the structuring shell.

Hereunder, embodiments are explained with reference to the drawing.

Figure 6:
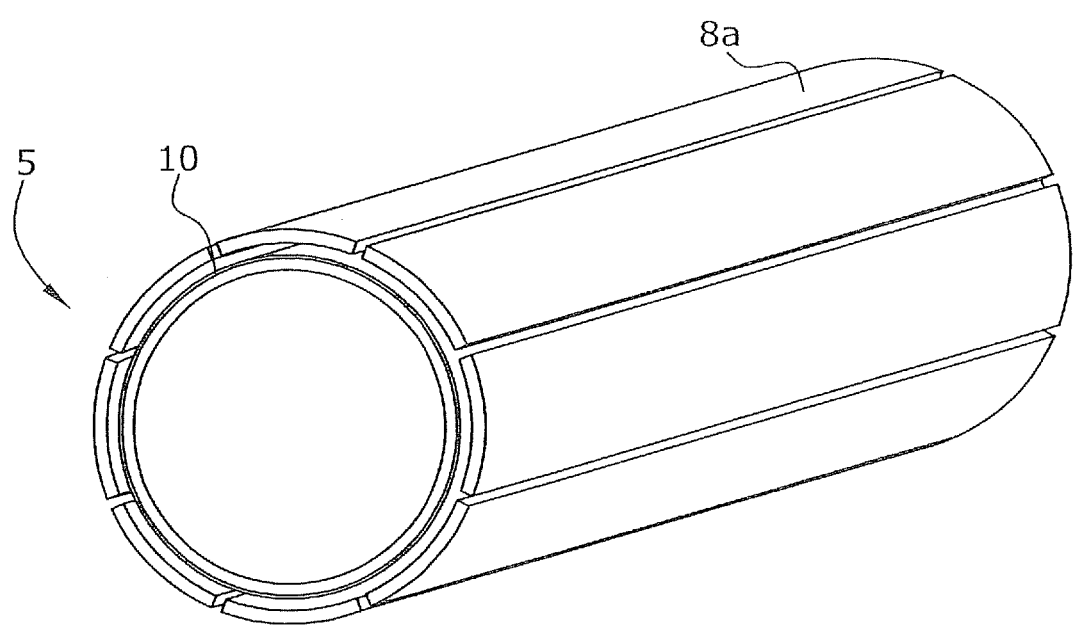

The Figures schematically show:

FIG. 1 a device for bonding a web-shaped textile product using hot gases,

FIG. 2 an enlarged detail of the structuring shell,

FIG. 3 a section A-A through the structuring shell in FIG. 2,

FIG. 4 the details of FIG. 3 with a material web arranged on the structuring shell, FIG. 5 a device for bonding a web-shaped textile product using hot gases, provided with an additional suction device, FIG. 6 an exploded view of a flow-through drum with a multi-part structuring shell.

FIG. 1 illustrates a thermobonding device (thermobonding oven) of the omega design. Guided around deflection rollers 2, 3, 4, the material web 1 to be bonded travels in the direction indicated by arrows around a large air-permeable flow-through drum 5. The flow-through drum 5 and the two rollers 3, 4, which supply the material web 1 to the outer circumference of the flow-through drum 5 and take the same from the outer circumference, are arranged in a housing 6 forming the treatment chamber which can be supplied with hot air via means not illustrated. The flow-through drum is arranged for rotation in the treatment chamber. Heated air is supplied to the treatment chamber via gas burners not illustrated. This air heated by the gas burners is drawn through the interior of the flow-through drum 5 by blowers not illustrated and known per se, whereby it also flows through the material web 1 to be bonded. The air may also be heated using an electric heating or heat exchangers heated with vapor and oil. The heated air thus flows from the treatment chamber through the material web placed on the flow-through drum and through the flow-through drum into the interior of the flow-through drum. Using a baffle (sheet) 7 in the region of the rollers 3, 4, it is avoided that the flow-through drum 5 is also flown through by the drying air in the part not wrapped by the material web 1.

The flow-through drum has a gas-permeable circumferential surface. This circumferential surface is a laxer of the drum shell. This layer is preferably designed as a screen fabric. The screen fabric can be mounted on a rigid drum shell layer provided with openings.

A structuring shell or a structuring template 8 is mounted on the circumferential surface. FIG. 2 shows an enlarged detail of the top plan view on the outer circumference of the structuring template 8 mounted on the flow-through drum 5. The embodiment illustrated is a metal sheet of 3 mm in thickness into which honeycomb-shaped openings 9 are punched.

FIG. 3 illustrates a section A-A through the structuring template 8 in FIG. 2. FIG. 3 shows that a cover in the form of a screen fabric 10 is provided on the outer circumference of or as the circumferential surface of the flow-through drum 5, the screen fabric being gas-permeable and having openings in the order of <1 mm due to the thickness of the weft and warp wires and to the density of weave. The sheet of the structuring template 8 is mounted in this screen fabric. The openings 9 of the structuring template 8 have a diameter >5 mm. Tests using honeycomb-shaped openings 9 and a diameter of 10 mm yielded a particularly pleasant appearance. Moreover, a measurable and palpable increase of volume can be obtained.

The screen fabric may be mounted on a rigid drum shell layer provided with openings. Preferably, this rigid drum shell layer provided with openings is made from a metal sheet formed into a drum into which openings have been created.

As an alternative, the screen fabric can be omitted so that structuring shell is mounted immediately on the rigid drum shell layer provided with openings. In this case, the rigid drum shell layer provided with openings is the gas-permeable circumferential surface. In this case, the openings of the rigid drum shell layer have a diameter smaller than 8 mm, preferably smaller than 5 mm. In this case, the structural shell has openings larger than 8 mm.

FIG. 4 illustrates the effect of the structuring template 8 and of the screen fabric 10 on the nonwoven 11 (the material web 1 in FIG. 1) during the flow-through of hot air. The nonwoven 11 is made of thermally fusible fibers and was formed as a nap by a card ahead of the thermobonding device described herein. The suction inside the flow-through drum 5 and the temperature of the air within the treatment chamber 6 are chosen such that the nonwoven 11 or the material web is bonded to the desired extent by the incipient fusion of the fibers caused by the flow-through. In the process, the nonwoven 11 or the material web is provided with a texture on the surface lying on the sheet of the structuring template 8. In the openings 9 of the structuring template 8, the fiber material is drawn deep to the screen fabric 10 acting as a barrier layer. Due to the barrier effect of the gas-permeable screen fabric 10, the nonwoven 11 is given a sufficiently smooth surface; fraying in the surface area is avoided.

A development of the invention is shown in FIG. 5. A suction box 12 is arranged within the flow-through drum 5, which comprises a suction slot 13 directed towards the lower side of the drum circumference. The suction slot 13 extends across the working width of the flow-through drum 5. The suction box 12 is connected with a suction device via ducts and is subjected to vacuum via this device. The extracted air is recirculated into the treatment chamber.

The vacuum generated in the suction box 12 can thus be higher than the vacuum generated by the blower in the flow-through drum 5. Thereby, the structuring effect can be enhanced purposefully in a manner largely independent of the bonding. An existing thermobonding device can readily be retrofitted with such a suction device.

The structuring shell 8 illustrated in the Figures may be of a single- or multi-piece design.

FIG. 6 illustrates a flow-through drum 5 with a multi-piece structuring shell 8, the structuring shell 8 being shown in an exploded view. As in FIGS. 1-5, the flow-through drum 5 and the structuring shell 8 are shown only schematically. For the sake of simplification, the openings in the structuring shell 8 and in the gas-Permeable circumferential surface of the flow-through drum 5 are not illustrated.

The individual pieces of the structuring shell 8 form segments 8'. The segments 8' are joined such that the joints between the individual pieces of the structuring shell 8 do not form seam imprints in a nonwoven 11 bonded and patterned by the structuring shell 8. Thus, the individual segments 8' are joined in a seamless manner so that no seam imprints exist in a nonwoven 11 bonded and patterned by the structuring shell 8. FIG. 6 illustrates a structuring shell 8 composed of six segments 8'. The segments are fastened to the flow-through drum 5 by fastening means not illustrated, such as bands or other tensioning means. The individual segments 8' of the structural shell 8 are illustrated just before joining so that the individual segments 8' show a small distance between each other and to the screen fabric 10.

LIST OF REFERENCE NUMERALS 1 fabric web, material web, nonwoven web
2 roller, deflection roller
3 roller, deflection roller
4 roller, deflection roller
5 drum, flow-through drum
6 housing, treatment chamber
7 baffle (cover)
8 structural template, metal sheet, structuring shell
8' segments of the structuring shell
9 opening (structuring template 8)
10 screen fabric
11 nonwoven
12 suction box
13 suction slot

The invention claimed is:

1. A device for bonding a web-shaped textile product having thermally fusible fibers that are fused during a bonding process by hot gases, comprising
  a drum that is rotatably mounted within a treating chamber to which hot air is supplied, said drum comprising a gas-permeable circumferential surface having a plurality of openings to provide gas-permeability, the drum being configured to be partly wrapped during use by the web-shaped textile product to be bonded
  a suction unit which is paired with the drum and by which the drum is placed under suction such that the hot air flows out of the treating chamber through the web-shaped textile product to be bonded during the bonding process;
  a heater for heating air that is supplied to the treating chamber and flows out of the treating chamber through the web-shaped textile product to be bonded; and
  a structured lining having a plurality of openings defining a regularly distributed pattern of geometric shapes configured to emboss the web-shaped textile product by the hot air flowing through the web-shaped product, the structured lining being wound onto the gas-permeable circumferential surface, said openings in the gas-permeable circumferential surface of the drum having a diameter smaller than 8 mm, and the openings in the structuring lining having a diameter larger than 8 mm, wherein the suction in the drum and the temperature of the hot air inside the treatment chamber have values selected to cause the material web to be patterned by the openings in the structured lining during the bonding process.

2. The device of claim 1, wherein the openings in the gas-permeable circumferential surface of the drum have a diameter smaller than 5 mm.

3. The device of claim 1, wherein the gas-permeable circumferential surface of the drum comprises a screen fabric.

4. The device of claim 1, wherein the structured lining mounted on the gas-permeable circumferential surface of the drum comprises a metal sheet with openings.

5. The device of claim 4, wherein the metal sheet has a thickness of more than 1 mm.

6. The device of claim 1, wherein within the drum, a suction box is arranged that is connected with a suction system and has a suction slot directed towards a lower side of the drum circumference.

7. The device of claim 1, wherein the structured lining is of a single-piece design.

8. The device of claim 1, wherein the structured lining is of a multi-piece design.

9. The device of claim 8, wherein the structured lining having the multi-piece design comprises a plurality of segments joined such that no seam imprints are formed in the web-shaped textile product bonded on the structured lining.

10. A method for bonding a web-shaped textile product having thermally fusible fibers by means of hot gases, comprising:

wrapping a material web around a gas-permeable flow-through drum arranged in a treatment chamber to which hot air is to be supplied, wherein the flow-through drum comprises at least a gas-permeable circumferential surface with a plurality of openings;

arranging a structuring shell with openings defining a regularly distributed pattern of geometric shapes on the circumferential surface, wherein the openings in the gas-permeable circumferential surface of the drum have a diameter smaller than 8 mm, and the openings in the structuring shell have a diameter larger than 8 mm;

supplying hot air having a desired temperature to the treatment chamber;

applying suction in the flow-through chamber so that the hot air is drawn from the treatment chamber through the material web over the entire surface; and choosing the suction in the flow-through drum and the desired temperature of the hot air inside the treatment chamber such that the material web is bonded on the structuring shell and is patterned by the openings in the structuring shell in a same process step.

* * * * *